United States Patent
Gopalakrishnan et al.

(10) Patent No.: US 8,851,379 B2
(45) Date of Patent: Oct. 7, 2014

(54) METHOD AND SYSTEM FOR DECODING SMALL SIZED BARCODES FROM BLURRED IMAGES

(75) Inventors: Praveen Gopalakrishnan, Hillsboro, OR (US); Victor B. Lortz, Beaverton, OR (US); Lei Yang, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 13/538,958

(22) Filed: Jun. 29, 2012

(65) Prior Publication Data

US 2014/0001265 A1    Jan. 2, 2014

(51) Int. Cl.
 *G06K 7/10*    (2006.01)
(52) U.S. Cl.
 USPC ...................................... 235/462.08; 235/494
(58) Field of Classification Search
 USPC ................................ 235/462.08, 462.01, 494
 See application file for complete search history.

(56) References Cited

U.S. PATENT DOCUMENTS 5,134,272 A * 7/1992 Tsuchiya et al. ......... 235/462.08

OTHER PUBLICATIONS

Eugene Joseph et al., "Bar Code Waveform Recognition Using Peak Locations", IEEE Transactions on Pattern Analysis and Machine Intelligence, vol. 16, No. 6, Jun. 1994, (pp. 630-640, total 11 pages).
Ramtin Shams et al., "Bar Code Recognition in Highly Distorted and Low Resolution Images", Copyright 2007, IEEE, ICASSO 2007, (pp. I-737-I-740, total 4 pages).
Johann C. Rocholl, "Robust 1D Barcode Recognition on Mobile Devices", Institute of Visualization and Interactive Systems and Department of Intelligent Systems, Apr. 29, 2009, (pp. 1-67, total 67 pages).

* cited by examiner

*Primary Examiner* — Karl D Frech
(74) *Attorney, Agent, or Firm* — Buckley, Maschoff & Talwalkar LLC

(57) ABSTRACT

An apparatus, system, and method to identify a region of an image including a barcode based on, at least in part, an entity specific feature associated with the barcode; detect a codeword boundary for the barcode based on, at least in part, an adaptive boundary determination mechanism; and decode the codeword based on, at least in part, a plurality of metrics associated with the entity.

24 Claims, 5 Drawing Sheets

100

IDENTIFY A REGION OF AN IMAGE INCLUDING A BARCODE BASED ON AN ENTITY SPECIFIC FEATURE ASSOCIATED WITH THE BARCODE
105

DETECT A CODEWORD BOUNDARY FOR THE BARCODE BASED ON AN ADAPTIVE BOUNDARY DETERMINATION MECHANISM
110

DECODE THE CODEWORD BASED ON A PLURALITY OF METRICS ASSOCIATED WITH THE ENTITY
115

METHOD AND SYSTEM FOR DECODING SMALL SIZED BARCODES FROM BLURRED IMAGES

BACKGROUND

Barcodes are typically read by machines. In some contexts, a barcode may be read based on an image including the barcode. In a conventional image including a barcode, the individual barcode spans a substantial or a majority of the pixels forming the image. For example, a user may need to position the camera of a smartphone in close proximity of a barcode in order to sufficiently capture a barcode suitable for image-based barcode decoding. As such, the barcode is typically and primarily in focus due to the positioning of the barcode relative to the camera.

While previously known techniques and procedures may be adequate to process images wherein the barcode occupies a majority proportion of an image and the barcode therein is nicely focused, such techniques and procedures may be inefficient and incompatible when decoding small barcode in the image that is not in-focus.

BRIEF DESCRIPTION OF THE DRAWINGS

Aspects of the present disclosure herein are illustrated by way of example and not by way of limitation in the accompanying figures. For purposes related to simplicity and clarity of illustration rather than limitation, aspects illustrated in the figures are not necessarily drawn to scale. Further, where considered appropriate, reference labels have been repeated among the figures to indicate corresponding or analogous elements.

DETAILED DESCRIPTION

Figure 1:
FIG. 1 is a flow diagram of a process, in accordance with some embodiments herein.
Figure 1:
Figure 1:

The following description describes an image-based barcode acquisition and processing method, device, or system that may support processes and operations to improve an efficiency and accuracy of processing images including barcodes. The disclosure herein provides numerous specific details regarding a method and system for implementing the processes and operations. However, it will be appreciated by one skilled in the art(s) related hereto that embodiments of the present disclosure may be practiced without such specific details. Thus, in some instances aspects such as control mechanisms and full software instruction sequences have not been shown in detail in order not to obscure other aspects of the present disclosure. Those of ordinary skill in the art will be able to implement appropriate functionality without undue experimentation given the included descriptions herein.

References in the specification to "one embodiment", "some embodiments", "an embodiment", "an example embodiment", "an instance", "some instances" indicate that the embodiment described may include a particular feature, structure, or characteristic, but that every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some embodiments herein may be implemented in hardware, firmware, software, or any combinations thereof. Embodiments may also be implemented as executable instructions stored on a machine-readable medium that may be read and executed by one or more processors. A machine-readable storage medium may include any tangible non-transitory mechanism for storing information in a form readable by a machine (e.g., a computing device). In some aspects, a machine-readable storage medium may include read only memory (ROM); random access memory (RAM); magnetic disk storage media; optical storage media; flash memory devices; solid state drives, and electrical and optical forms of signals. While firmware, software, routines, and instructions may be described herein as performing certain actions, it should be appreciated that such descriptions are merely for convenience and that such actions in fact result from computing devices, processors, controllers, and other devices executing the firmware, software, routines, and instructions.

The present disclosure relates to image-based barcode acquisition and processing methods, devices, and systems in which a large area image including a barcode therein is examined to identify and decode the barcode. In general, the image includes an area comprising more scenery and objects than an individual barcode. In some aspects, the barcode may comprise a relatively small region of the image. For example, the image may include a scene of a retailer's sales floor with shelving stocked with products or a storeroom or warehouse with shelves of stocked products, wherein the products are labeled with barcodes. As such, the region of the image containing a representation of a barcode may be out-of-focus or "blurred". As used herein, "blurred" may be generally used to refer to an image or at least parts thereof that are not completely clear, in focus, or without image distortions. In some aspects, the blurred image may be due to limitations of the camera device or system used to acquire the image, operator error, processing of the image (e.g., pre- and post-capture processing including but not limited to image compression, format conversions, etc.), and any other reason. In some aspects, the output of a method, device, or system in some embodiments herein may include an indication or record of the decoded barcode, as determined from a blurred image of the barcode.

FIG. 1 is an illustration of a process according to some embodiments herein, generally referenced by reference number 100. In some embodiments, process 100 may be invoked by a camera, device, or system configured to implement the functionality depicted in FIG. 1. In some embodiments, the device or system may be a personal computer (PC), a laptop computer, a tablet computing device, a dedicated processor-based device, a mobile media/multimedia player appropriately equipped, etc. In some aspects, process 100 may be initiated when a device, service, or system is directed, either automatically or at the request of some entity, to determine one or more barcodes from an acquired image of a scene including the one or more barcodes.

An image may be received at operation 105. In some aspects, the image may be acquired by a device, system, or service that executes one or more of the operations of process 100. In some embodiments, the image may be received from another device, system, or service, via a storage facility or a transmission. Accordingly, acquisition of the image itself may not necessarily constitute a part of process 100.

Operation 105 may operate to identify a region of the image that includes a barcode. As mentioned above, the image may include a large area, wherein a barcode may not form a significant portion of the captured image scene. As such, a number of previous techniques for recognizing barcodes may be insufficiently accurate and/or inefficient in identifying a barcode in the large area images contemplated and considered in some embodiments herein. Process 100 may therefore base the identifying of the barcode in the images on at least one entity specific feature associated with the barcode.

In some embodiments, including but not limited to a retail or manufacturing context, an entity using barcodes may use a particular barcode configuration having features specific to them. The entity's barcode features may include a wide variety of features, wherein some of the features may individually be unique and some of the features in combination with each other may constitute a unique feature specific to the entity.

Figure 2:
FIG. 2 is an illustrative depiction of a barcode label, in accordance with some embodiments herein.

In some aspects, the entity specific features associated with the barcode may be on a common label with the barcode. FIG. 2 is an example of a label 200 including an entity's (e.g., a retailer) barcode 205. As shown, label 200 includes barcode 205, a label header 210, and label text 215. In some embodiments, all of the entity's labels of the present example are configured in a same or like manner. Thus, there is consistency in the configuration of the entity's barcode labels and the barcode elements included on the label. For example, label header 210 and label text 215 may each be positioned relative to barcode 205 according to a fixed formatting scheme. In some aspects, the relative size or proportions of the elements comprising barcode label 200 may adhere to a set value or range of values. In some instances, label header 210 may be a specific color for the entity and label text 215 may include specific text or other indicia (e.g., a specific icon or other symbol).

In some aspects, the entity specific features associated with the barcode, including individual features and/or combinations thereof, may be more resistant to image blur than a barcode alone.

In some aspects, the entity specific features may include features, aspects, and characteristics not forming a part of the features that intrinsically define the barcode itself. In some instances, the features that define the barcode itself are referred to herein as "barcode features". In some instances, the barcode features may be standardized by a standards setting entity. As such, the barcode features are not determined, set, or specific to any particular entity.

An output of operation 105 may include one or more regions or sub-images of the image received as an input to operation 105. In some embodiments, each of the one or more regions or sub-images output by operation 105 may include a detected barcode within the input image.

In some embodiments, a barcode may comprise a predetermined plurality of codewords depending on the type and formatting of the barcode. For example, a UPC-A standardized barcode may comprise 12 codewords with 7 bits per codeword. In some instances, detecting the boundaries between and within codewords may be used to decode the barcode. Referring to FIG. 1, process 100 proceeds to operation 110 where a codeword boundary for the barcode identified in operation 105 is detected. In some instances, operation 110 may operate to detect the boundaries between and within codewords of the barcode from operation 105. The barcode boundaries detected by operation 110 may form at least a part of an output of operation 110 that may be received by operation 115 to further aid in decoding the barcode(s) detected and identified in the input image.

In some embodiments, the boundaries of a codeword are detected by finding the local extrema points along an intensity map of a row of pixel representations of the barcode. Each codeword may comprise a fixed number of extrema points for any given barcode symbology (e.g., 4 for a UPC-A formatted barcode). Thus, once the extrema points are known then the boundaries of the codeword may be determined.

Since the barcodes from the images herein may be relatively small and blurred as discussed above, there may be a tendency to detect false or erroneous extrema points using conventional extrema point detection techniques. Therefore, some embodiments herein include detecting the boundaries between codewords using an adaptive boundary determination mechanism that functions to remove false extrema points (i.e., maxima, minima) from consideration. In some aspects, the adaptive boundary determination mechanism herein using a "learning algorithm" to detect false extrema points and automatically corrects the location of adjacent "true" extrema points.

Example pseudo-code for an illustrative adaptive boundary determination mechanism may include the following:

```
For codeword i = 1:N
{
    Find codeword boundary(i)
    Codeword Density(i)= #pixels spanning codeword / #bits in codeword
    Average Density = average(Codeword Density(1),...,Codeword
    Density(i-1))
    If (|Average Density - Codeword Density(i)| > threshold)
        Pick new codeword boundary(i) so that the above conditionis met
        Update extrema point location
}
```

Thus, as illustrated by the above pseudo-code, the algorithm of the adaptive boundary determination mechanism provides level setting of a threshold. The threshold may relate to a color and/or contrast parameter. The algorithm of this example also removes "false" extrema points by picking a new codeword boundary and updating of the extrema point location to find a suitable threshold to separate minima and extrema points.

In some aspects, the algorithm of the adaptive boundary determination mechanism may "learn" the average codeword density as it considers each codeword. Based on this learned knowledge, the adaptive boundary determination mechanism adjusts the selection of the extrema points indicative of the codeword boundaries.

In some aspects, updating of the extrema point location may be accomplished based on the following logic:
  Determine whether a removed extrema pair is closer to adjacent maxima or minima;
  If closer to adjacent maxima→modify adjacent maxima location by taking a weighted average location of current location and two removed extrema points; and
  If closer to adjacent minima→modify adjacent minima location by taking a weighted average location of current location and two removed extrema points;

In some embodiments, operation 110 to detect a codeword boundary may further rely on at least one entity specific feature to determine the codeword boundaries. In some instances, the at least one entity specific feature used to determine the codeword boundaries at operation 110 may include some of the same (or other) entity specific features used in operation 105. In some instances for example, analyzing a position and size of the barcode detected in an image relative to other features in a barcode label can be used to improve barcode decoding according to some embodiments herein. In some embodiments such as the example of FIG. 2, label header 210 may be detected and the size thereof analyzed. Again, label header 210 may have a distinct consistent color and aspect ratio for a particular entity. The knowledge gained from the detection and analysis of label header 210 may be used to correctly calculate or estimate a width of the barcode and the codeword boundaries.

In some aspects, knowledge of the characteristics of the camera, device, or system used to acquire the image including the barcode may be used by operation 110. For example, knowing that the camera that captured the image tends to blur scene elements near a periphery of a captured image or has a rather limited depth of field characteristic can be used by operation 110 (and some other operations herein) to enhance the depth and type of analysis used at operation 110. In some instances, and analysis of the image and/or regions thereof may be modified based on the knowledge of the camera's characteristics.

Proceeding with process 100, operation 115 receives the codeword boundaries as determined at operation 110. Operation 115 may function to convert the codeword boundaries into codewords (i.e., decode the barcode) based on a plurality of metrics associated with the entity. The multi-metric decoding of operation 115 may use a plurality of metrics rather than only using the conventional intrinsic features of the codeword boundaries. Some embodiments herein may combine a plurality of metrics in an intelligent manner to render a barcode decoding scheme or mechanism that is more robust than an operation that may use any individual metrics independently of each other.

In some embodiments, the multi-metric features of operation 115 may include one or more of an inner extrema distance, an intra codeword boundary distance, a binary bit pattern matching, and other features. In some embodiments herein, the multi-metric features may include (i) codeword width patterns and (ii) soft decision decoding. In some aspects, the features (i) and (ii) may be used alone and together, and in some embodiments collectively or individually with or without any of the other multi-metric features.

As used herein, soft decision decoding refers to a method of computing a confidence level of a particular bit level and using the computed confidence level value in a comparison to determine a most likely pattern match.

In some embodiments, a weighted combining method may be used to combine the different multiple metrics to finally compute the codeword that closely resembles or matches a candidate or input codeword. Weights may be determined based on confidence levels that a particular bit/codeword is decoded correctly using a given metric.

In some instances herein, operations 110 and 115 may be repeated using different threshold values for determining codeword boundaries and using similar confidence weighted averaging to pick the best result from the set of results. That is, several different threshold values may be used in the codeword boundary calculations with the best fitting results being ultimately being used.

In some aspects of some embodiments, multiple pixel rows of a barcode may be inspect and decoded. By referencing more than one row of pixels for a given barcode, accuracy of a barcode decoding process may be improved. Furthermore, errors caused or attributable to imaging inaccuracies, image blurring, image compression, scene lighting deficits, and other imaging artifacts and degradations may be eliminated, at least in part, by using a diversity of pixel rows in the inspection and decoding operations herein.

In some embodiments, the robustness of some embodiments herein may be enhanced by using information and knowledge of an existing database to confirm the validity of detected barcodes. For example, in a retail operations context an inventory database may exist that stores the set of barcodes corresponding to the items present in a given storage area. By comparing the results of the image-based barcode decoding herein (e.g., an output of operation 115) to database records associated with the same storage area, decoding errors may be detected and corrected in some embodiments. A decoded barcode result that does not match any of the database records may be eliminated as a potential valid decoded barcode.

Figure 3:
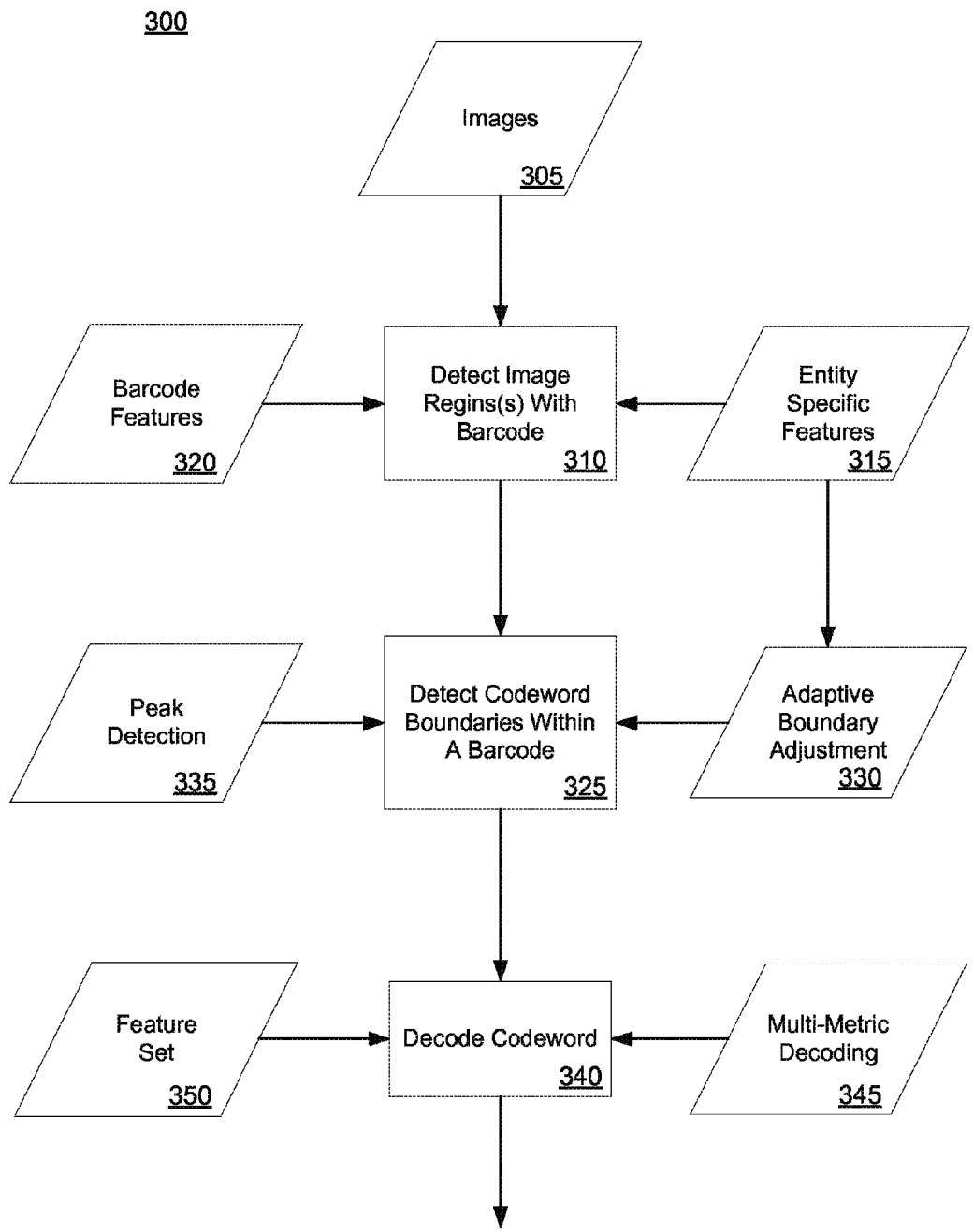
FIG. 3 is an illustrative flow diagram of a process, in accordance with one embodiment.

FIG. 3 is an illustrative depiction of a flow diagram of an image-based barcode decoding process, generally represented by the reference number 300. Process 300 receives images 305 as an input and outputs decoded barcodes from operation 340. According to process 300, images 305 including barcodes therein are received by operation 310. Operation 310 provides a mechanism to identify or detect region(s) of the image including a barcode. The determination of the region(s) containing the barcode may be based on entity specific features 315, in a manner discussed above with FIG. 1. Additionally, determination of the region(s) containing the barcode may also be computed based on barcode features 320. Barcode features 320 may be intrinsic features defining the barcode itself. For example, barcode features 320 may be used to detect high/low gradients within a image in one aspect of detecting a location of a barcode in the image.

The detected region(s) identified as containing a barcode and output from operation 310 may be provided as an input to operation 325. Operation 325 provides a mechanism to detect codeword boundaries of and within a barcode. The detection of the codeword boundaries may be determined based on an adaptive boundary adjustment mechanism 330, in a manner similar to that discussed above with regard to FIG. 1 and operation 110. Additionally, the detection of the codeword boundaries may also be computed based on, in part, a barcode peak detection result 335. Peak detection results 325 may include an indication of a fixed number of extrema points in the barcode image region(s). However, since the images considered herein may be blurry and/or out-of-focus then the detection of the codeword boundaries may be enhanced by the determinations of adaptive boundary adjustment mechanism 330.

In some instances, as illustrated in FIG. 3, entity specific features 315 may be used by the adaptive boundary adjustment mechanism 330 to detect codeword boundaries 325. This aspect of process 300 may be similar to operation 110 using the entity specific features of FIG. 1.

The detected codeword boundaries detected at operation 325 may be provided as an input to operation 340. Operation 340 provides a mechanism to decode codewords. The decoding of codewords may be determined based on a multi-metric operation 345, in a manner similar to that discussed above with regard to FIG. 1 and operation 115. Additionally, the decoding of the codeword may also be computed based on, in part, a feature set 350 of the barcode, as indicated in FIG. 3. An output of operation 340 may include a decoded barcode.

Process 300 may provide for an improved and enhanced method, device, and system for image-based decoding of barcodes. The improvements and enhancements in barcode decoding may be facilitated by the unique combination of considerations disclosed in, for example, processes 200, 300, and other embodiments herein.

Figure 4:
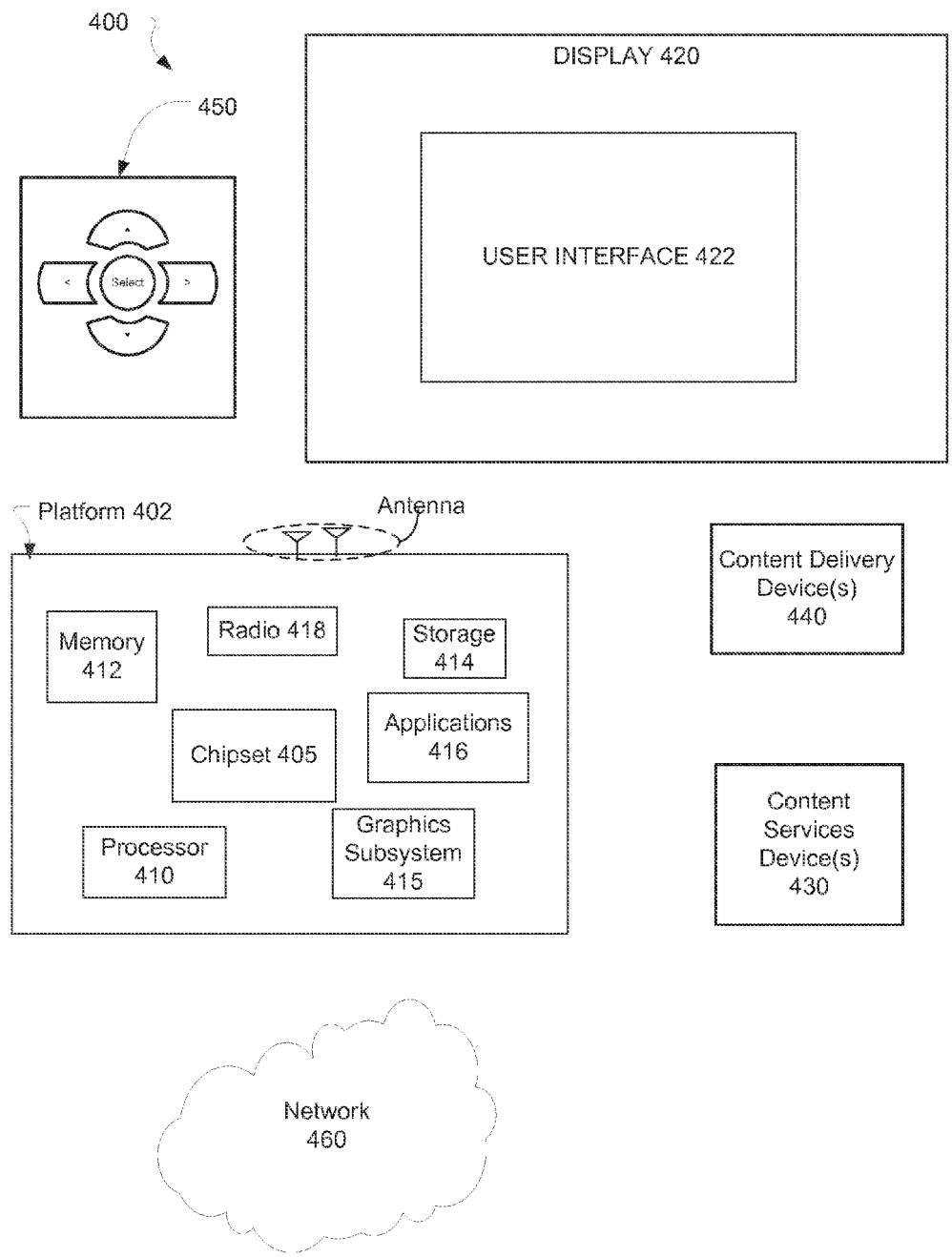
FIG. 4 illustrates a system, in accordance with some embodiments herein.

FIG. 4 illustrates an embodiment of a system 400. In embodiments, system 400 may be a media system although system 400 is not limited to this context. For example, system 400 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, and so forth.

In some embodiments, system 400 comprises a platform 402 coupled to a display 420. Platform 402 may receive content from a content device such as content services device(s) 430 or content delivery device(s) 440 or other similar content sources. A navigation controller 450 comprising one or more navigation features may be used to interact with, for example, platform 402 and/or display 420. Each of these components is described in more detail below.

In embodiments, platform 402 may comprise any combination of a chipset 405, processor 410, memory 412, storage 414, graphics subsystem 415, applications 416 and/or radio 418. Chipset 405 may provide intercommunication among processor 410, memory 412, storage 414, graphics subsystem 415, applications 416 and/or radio 418. For example, chipset 405 may include a storage adapter (not depicted) capable of providing intercommunication with storage 414.

Processor 410 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 410 may comprise dual-core processor(s), dual-core mobile processor(s), and so forth.

Memory 412 may be implemented as a volatile memory device such as, but not limited to, a Random Access Memory (RAM), Dynamic Random Access Memory (DRAM), or Static RAM (SRAM).

Storage 414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 414 may comprise technology to increase the storage performance enhanced protection for valuable digital media when multiple hard drives are included, for example.

Graphics subsystem 415 may perform processing of images such as still or video for display. Graphics subsystem 415 may be a graphics processing unit (GPU) or a visual processing unit (VPU), for example. An analog or digital interface may be used to communicatively couple graphics subsystem 415 and display 420. For example, the interface may be any of a High-Definition Multimedia Interface, DisplayPort, wireless HDMI, and/or wireless HD compliant techniques. Graphics subsystem 415 could be integrated into processor 410 or chipset 405. Graphics subsystem 415 could be a stand-alone card communicatively coupled to chipset 405.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 418 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 418 may operate in accordance with one or more applicable standards in any version.

In embodiments, display 420 may comprise any television type monitor or display. Display 420 may comprise, for example, a computer display screen, touch screen display, video monitor, television-like device, and/or a television. Display 420 may be digital and/or analog. In embodiments, display 420 may be a holographic display. Also, display 420 may be a transparent surface that may receive a visual projection. Such projections may convey various forms of information, images, and/or objects. For example, such projections may be a visual overlay for a mobile augmented reality (MAR) application. Under the control of one or more software applications 416, platform 402 may display user interface 422 on display 420.

In embodiments, content services device(s) 430 may be hosted by any national, international and/or independent service and thus accessible to platform 402 via the Internet, for example. Content services device(s) 430 may be coupled to platform 402 and/or to display 420. Platform 402 and/or content services device(s) 430 may be coupled to a network 460 to communicate (e.g., send and/or receive) media information to and from network 460. Content delivery device(s) 440 also may be coupled to platform 402 and/or to display 420.

In embodiments, platform 402 may receive control signals from navigation controller 450 having one or more navigation features. The navigation features of controller 450 may be used to interact with user interface 422, for example. In embodiments, navigation controller 450 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 450 may be echoed on a display (e.g., display 420) by movements of a pointer, cursor, focus ring, or other visual indicators displayed on the display. For example, under the control of software applications 416, the navigation features located on navigation controller 450 may be mapped to virtual navigation features displayed on user interface 422, for example. In embodiments, controller 450 may not be a separate component but integrated into platform 402 and/or display 420. Embodiments, however, are not limited to the elements or in the context shown or described herein.

In various embodiments, any one or more of the components shown in system 400 may be integrated.

In various embodiments, system 400 may be implemented as a wireless system, a wired system, or a combination of both. When implemented as a wireless system, system 400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 400 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 400 may be embodied in varying physical styles or form factors. Figure f illustrates embodiments of a small form factor device 500 in which system 400 may be embodied. In some embodiments, for example, device 500 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
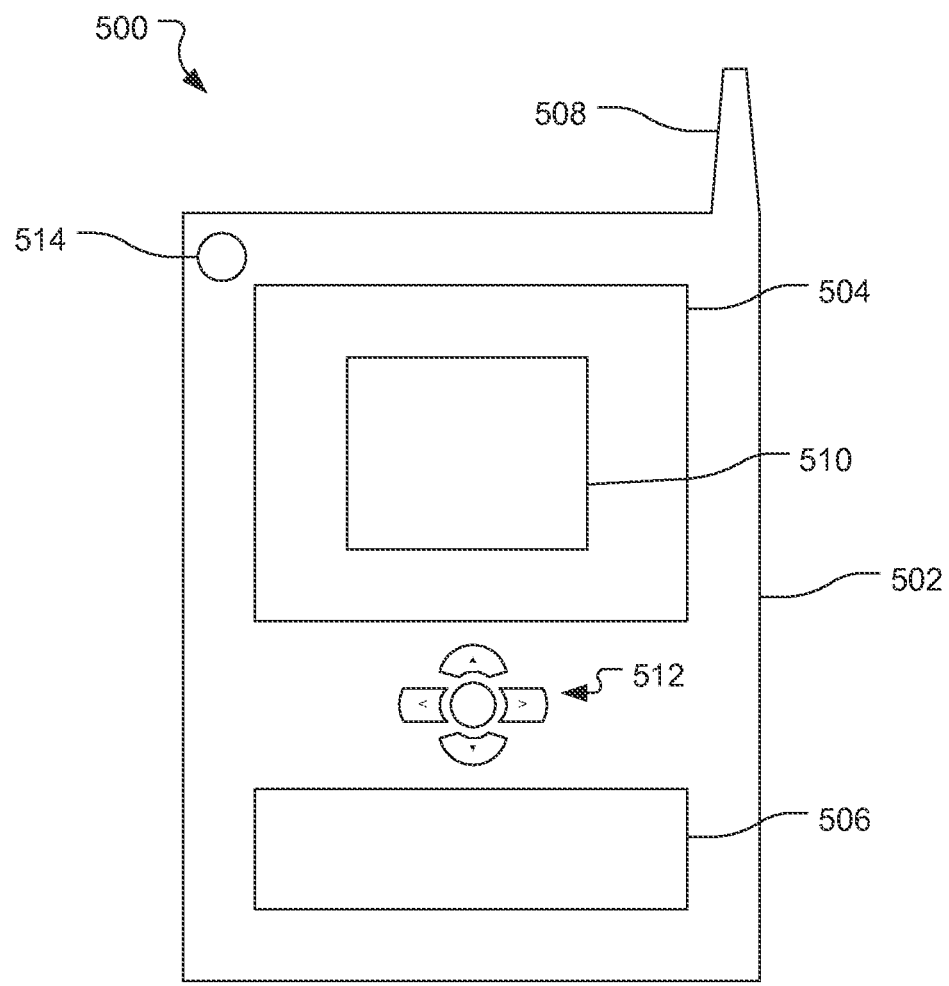
FIG. 5 is an illustration of an embodiment of the system of FIG. 4 according to an embodiment herein.

As shown in FIG. 5, device 500 may comprise a housing 502, a display 504 for displaying image 510, an input/output (I/O) device 506, an antenna 508, and a camera lens 514 coupled to a camera (sub)system (not shown). Device 500 also may comprise navigation features 512. Display 504 may comprise any suitable display unit for displaying information appropriate for a mobile computing device. I/O device 506 may comprise any suitable I/O device for entering information into a mobile computing device. Examples for I/O device 506 may include an alphanumeric keyboard, a numeric keypad, a touch pad, input keys, buttons, switches, rocker switches, microphones, speakers, voice recognition device and software, and so forth. Information also may be entered into device 500 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

All systems and processes discussed herein may be embodied in program code stored on one or more computer-readable media. Such media may include, for example, a floppy disk, a CD-ROM, a DVD-ROM, one or more types of "discs", magnetic tape, a memory card, a flash drive, a solid state drive, and solid state Random Access Memory (RAM) or Read Only Memory (ROM) storage units. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method, comprising:
   identifying a region of an image including a barcode based on, at least in part, an entity specific feature associated with the barcode and included in the image, the entity specific feature associated with the barcode not being a feature that intrinsically defines the barcode itself;

detecting a codeword boundary for the barcode based on, at least in part, an adaptive boundary determination mechanism; and decoding the codeword based on, at least in part, a plurality of metrics associated with the entity.

2. The method of claim 1, wherein the identifying of a region of the image including the barcode is further based on features of the barcode itself.

3. The method of claim 1, wherein the at least one entity specific feature associated with the barcode is at least one of a particular color, an aspect ratio of the barcode to a label size, a particular indicia, and an overall spatial configuration of a label.

4. The method of claim 1, wherein the adaptive boundary determination mechanism for detecting the codeword boundary for the barcode comprises:

adaptively learning an average codeword density; and adjusting a selection of the codeword boundary based on the learned average codeword density.

5. The method of claim 1, wherein the detecting of the codeword boundary is further based on the at least one entity specific feature associated with the barcode.

6. The method of claim 1, wherein at least one of the plurality of metrics associated with the entity comprises a codeword width pattern, a weighted average value, and a confidence level value.

7. The method of claim 1, wherein the decoding of the codeword is further based on an inspection and decoding of multiple rows of the barcode.

8. The method of claim 1, wherein the decoding of the codeword is further based on comparing a preliminary result of the decoding with a record of known valid barcodes.

9. A system, comprising:

a memory having processor executable instructions stored thereon; and a processor in communication with the memory to execute the instructions to:

identify a region of an image including a barcode based on, at least in part, an entity specific feature associated with the barcode and included in the image, the entity specific feature associated with the barcode not being a feature that intrinsically defines the barcode itself;

detect a codeword boundary for the barcode based on, at least in part, an adaptive boundary determination mechanism; and decode the codeword based on, at least in part, a plurality of metrics associated with the entity.

10. The system of claim 9, wherein the identifying of a region of the image including the barcode is further based on features of the barcode itself.

11. The system of claim 9, wherein the at least one entity specific feature associated with the barcode is at least one of a particular color, an aspect ratio of the barcode to a label size, a particular indicia, and an overall spatial configuration of a label.

12. The system of claim 9, wherein the adaptive boundary determination mechanism for detecting the codeword boundary for the barcode comprises:

adaptively learning an average codeword density; and adjusting a selection of the codeword boundary based on the learned average codeword density.

13. The system of claim 9, wherein the detecting of the codeword boundary is further based on the at least one entity specific feature associated with the barcode.

14. The system of claim 9, wherein at least one of the plurality of metrics associated with the entity comprises a codeword width pattern, a weighted average value, and a confidence level value.

15. The system of claim 9, wherein the decoding of the codeword is further based on an inspection and decoding of multiple rows of the barcode.

16. The system of claim 9, wherein the decoding of the codeword is further based on comparing a preliminary result of the decoding with a record of known valid barcodes.

17. A computer-readable medium storing processor-executable instructions thereon, the medium comprising:

instructions to identify a region of an image including a barcode based on, at least in part, an entity specific feature associated with the barcode and included in the image, the entity specific feature associated with the barcode not being a feature that intrinsically defines the barcode itself;

instructions to detect a codeword boundary for the barcode based on, at least in part, an adaptive boundary determination mechanism; and instructions to decode the codeword based on, at least in part, a plurality of metrics associated with the entity.

18. The medium of claim 17, wherein the identifying of a region of the image including the barcode is further based on features of the barcode itself.

19. The medium of claim 17, wherein the at least one entity specific feature associated with the barcode is at least one of a particular color, an aspect ratio of the barcode to a label size, a particular indicia, and an overall spatial configuration of a label.

20. The medium of claim 17, wherein the adaptive boundary determination mechanism for detecting the codeword boundary for the barcode comprises:

adaptively learning an average codeword density; and adjusting a selection of the codeword boundary based on the learned average codeword density.

21. The medium of claim 17, wherein the detecting of the codeword boundary is further based on the at least one entity specific feature associated with the barcode.

22. The medium of claim 17, wherein at least one of the plurality of metrics associated with the entity comprises a codeword width pattern, a weighted average value, and a confidence level value.

23. The medium of claim 17, wherein the decoding of the codeword is further based on an inspection and decoding of multiple rows of the barcode.

24. The medium of claim 17, wherein the decoding of the codeword is further based on comparing a preliminary result of the decoding with a record of known valid barcodes.

* * * * *